United States Patent
Cormann

[19]

[11] Patent Number: 6,076,316
[45] Date of Patent: Jun. 20, 2000

[54] RIGID ANGULAR SECTION FOR LAYING TUBING AND PIPES

[75] Inventor: Hans-Günther Cormann, Köln, Germany

[73] Assignee: Licatec GmbH, Frechen, Germany

[21] Appl. No.: 09/120,892

[22] Filed: Jul. 23, 1998

[30] Foreign Application Priority Data

Jul. 25, 1997 [EP] European Pat. Off. .............. 97112858

[51] Int. Cl.$^7$ ...................................................... E04C 2/52
[52] U.S. Cl. ......................... 52/220.1; 52/732.1; 52/732.2
[58] Field of Search ............................... 52/732.1, 732.2, 52/220.1, 287.1, 288.1, 71, 732.3, 69, 70; 174/45

[56] References Cited

U.S. PATENT DOCUMENTS

| | | | |
|---|---|---|---|
| 3,689,681 | 9/1972 | Searer et al. ................................ | 174/48 |
| 4,608,794 | 9/1986 | Delise ........................................ | 52/288 |
| 4,888,921 | 12/1989 | Markham .................................... | 52/63 |
| 5,493,817 | 2/1996 | Speer ......................................... | 52/69 |
| 5,704,175 | 1/1998 | Lewis ....................................... | 52/288.1 |

*Primary Examiner*—Richard Chilcot
*Attorney, Agent, or Firm*—Blank Rome Comisky & McCauley LLP

[57] ABSTRACT

Mounting apparatus is disclosed for installations of tubing, pipes, cables and other rigid or flexible elongate elements. A first segment of the apparatus includes a pair of relatively flat, longitudinally extending rectangular members rigidly fastened together along a longitudinal edge of each to maintain a predetermined angle, nominally a right angle, between them. Additional segments, each constituting a flat longitudinally extending member substantially coextensive longitudinally with the others, are pivotally connected to adjacent segments along corresponding longitudinal edges, one of these members being pivotally connected at a longitudinal edge of one member of the pair for the first segment. In this way, the latter segment may be pivoted to position it at a selected angle to the first segment, with which it is connected to form an open or closed polygon which can receive and retain the tubing, pipes, cables or other rigid or flexible elongate elements when the mounting apparatus is in use. And when not in use, the apparatus is readily stacked with the pivotally connected members arranged to lie flat against one another. The pivotal connection, which may, for example, be a hinge bar of soft plastic, a detachable hinged connection, or a reduced wall thickness between the two members connected by it, is lockable to permit them to be held together at the selected angle. A reinforcing strut, which may be a longitudinal inclined section substantially perpendicular to a plane bisecting the predetermined angle between the members of the first segment, is provided in the corner which forms that angle.

23 Claims, 7 Drawing Sheets

RIGID ANGULAR SECTION FOR LAYING TUBING AND PIPES

BACKGROUND OF THE INVENTION

The invention concerns a rigid, angular plastic section.

In the prior art flat plastic bands consisting of several single segments are known that are manufactured continuously by using an extrusion process. Such flat plastic bands are known, for example, from WO 80/02476, DE 87 10 777.5, and EP 0 696 097. Although the plastic sections known in the prior art are no doubt useful, they nonetheless have serious disadvantages during professional installation.

During installation these flat plastic bands are either fastened as a band on the background or folded up before fastening, i.e., the side walls are raised. With both methods of fastening the object disadvantages occur during installation. When fastening it in a flat state the elastic band adjusts to the background and becomes wavy with uneven backgrounds due to the small bending resistance. When the side walls are raised later, an undesired deformation of the cable duct section results, as a result of which the entire visual effect as well as the locking function of the top segment are negatively affected.

While being installed in corners, the individual segments of these flat plastic bands—at least the segment turned toward the corner—must be raised before fastening. This time-consuming act considerably hinders installation.

When fastening it in a closed state—i.e., the side walls of the plastic band are raised before installation—there is a disadvantage, in addition to the time-consuming act of raising them, that the closed cable duct section can only be fastened with difficulty with screws, pegs, or nails because the side walls hinder access while fastening it.

Moreover, cable ducts that are manufactured and installed as rigid, U-shaped cable duct segments are known from the prior art. These cable duct segments, limited by their U-shaped construction, have the disadvantage that the packing volume is high, which has a negative effect on the packing, storage, and transport costs.

Independent of where these cable duct segments are installed, they have the disadvantage that access to the fastening points is hindered by the side walls, which increases the installation time Side recesses must be constructed in a very time-consuming way by measuring, sawing, and breaking out the part to be removed. This process is nearly impossible when the cable ducts are in their installed state.

SUMMARY OF THE INVENTION

The invention thus seeks to solve the problem of developing a plastic segment that is distinguished by a small packing, storage, and transport volume, that displays high stability properties during installation, that equalizes wall unevenness without a problem, that provides one with free access to the fastening point, and that has a basic element that does not need to be raised or locked into place before being installed in a corner and can be constructed in a time-saving fashion when there are side recesses—even after being installed.

The problem is solved by a plastic section that comprising a rigid, angular basic segment, to which additional plastic segments are connected in such a manner that an open or closed polygon is formed by raising and locking these additional individual plastic segments, characterized by the fact that at least one of the latter segments is elastically connected to the rigid, angular basic segment.

Preferred designs of the cable duct section are specified by the properties of the subclaims characterized in that the basic segment is essentially rectangular, is stiffened in the interior angle by a reinforcement, is sloped or rounded off in the exterior angle area by an incline; and the at least one elastically connected plastic segment is an angle section, and either it or the basic segment is provided with slots, and has locking elements for mounting a dividing wall which is elastically or rigidly connected to that plastic segment or the basic segment; and the basic segment is formed from two component segments connected by a walkway composed of an easily separable material.

The plastic segment that is the basis of the invention gives the cable duct a high flexural strength even in an opened state, as a result of which it is possible to equalize wall unevenness without the cable duct adapting to the uneven background. This guarantees that the visual effect and the locking function of the top segment or the side segment is flawless without one or more segments having to be raised before fastening them. This cuts down installation time considerably.

At the same time, the plastic segment according to the invention can be fastened simply in an opened state with nails, screws, or pegs because access to the fastening points is not hindered by the side wall. It is possible to construct side recesses, even when the segment is installed, by using the elastic and easily separable connection between the individual segments. In this connection the wide walls are cut out or notched and the elastic link cut or torn off. The plastic section according to the invention is also distinguished by the fact that it results in a high packing density when the individual sections are stacked on each other. As a consequence, the packing, storage, and transport costs are clearly reduced in comparison with the U-shaped cable duct sections. In addition to its usefulness in laying cable and tubing, the plastic section according to the invention is suitable for laying pipes and lining pipes and tubing at a later point in time.

BRIEF DESCRIPTION OF THE DRAWINGS

The invention is illustrated by using the working examples shown diagrammatically in the figures below.

DETAILED DESCRIPTION OF THE PREFERRED EMBODIMENTS

In the figures the same parts are provided with the same reference numbers, in which 1 is the rigid, angular basic segment, 2 is a plastic segment, 3 is a reinforcement, 4 is an elastic link, 5 is an incline, 6 is a dividing wall, 7 is a mounting piece, 8 is a slot, and 9 is a walkway.

1. The plastic section forming the basis of the invention is produced as a continuous section and sawed square according to needs. Not shown are additional fastening possibilities such as adhesive tape, perforations, and locking elements. These locking elements hold the basic segment 1 and other elastically connected plastic segments (2, 2') in a definite position after they are raised.

Figure 1:
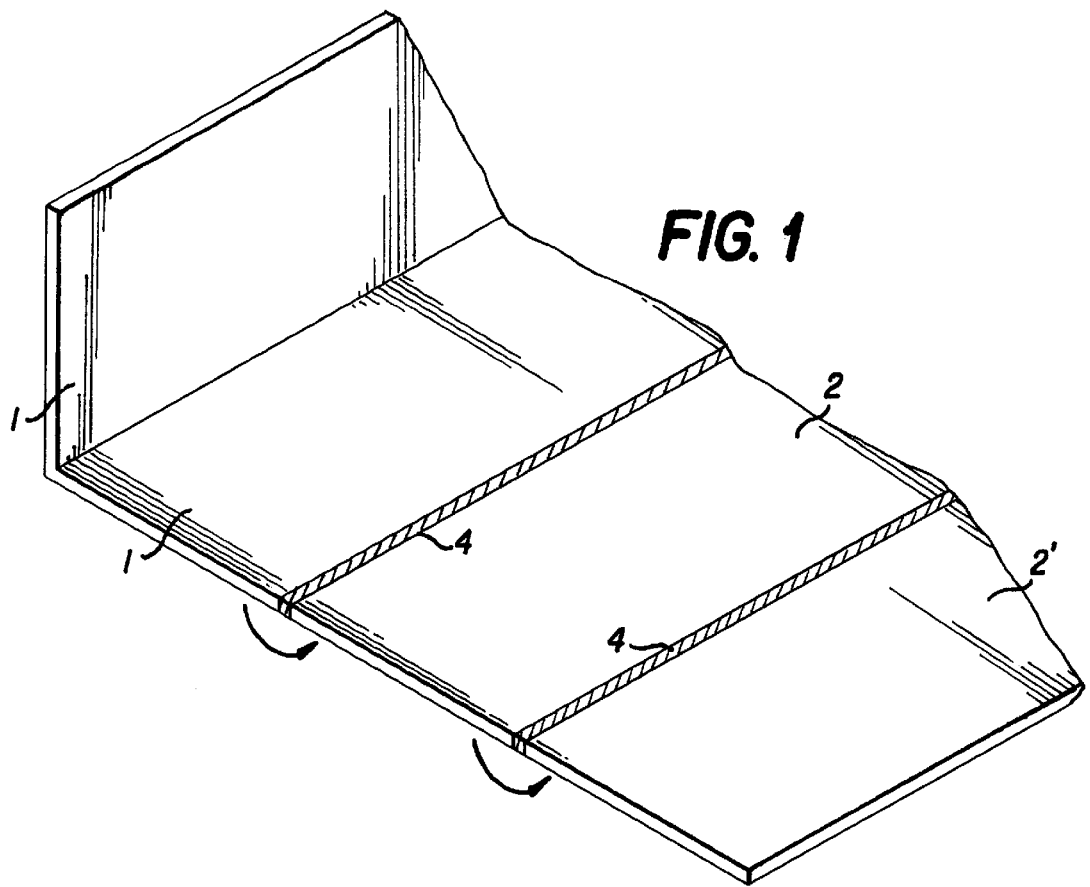
FIG. 1 shows the plastic section as a rigid, angular basic segment with other elastically connected segments in a perspective view.

In FIG. 1 a rigid, angular basic segment is designated as 1. Other plastic segments that are elastically connected to the segment designated as 1 are designated as 2. The elastic link is designated as 4. This link 4 can be produced, for example, by using a hinged bar made of soft plastic, a detachable hinged connection, or by reducing the wall thickness between the individual segments. Several parts of the plastic section shown in FIG. 1 can be stacked on each other in a space-saving fashion, thus lowering the packing, storing, and transport volume, and as a result, the costs.

Figure 2:
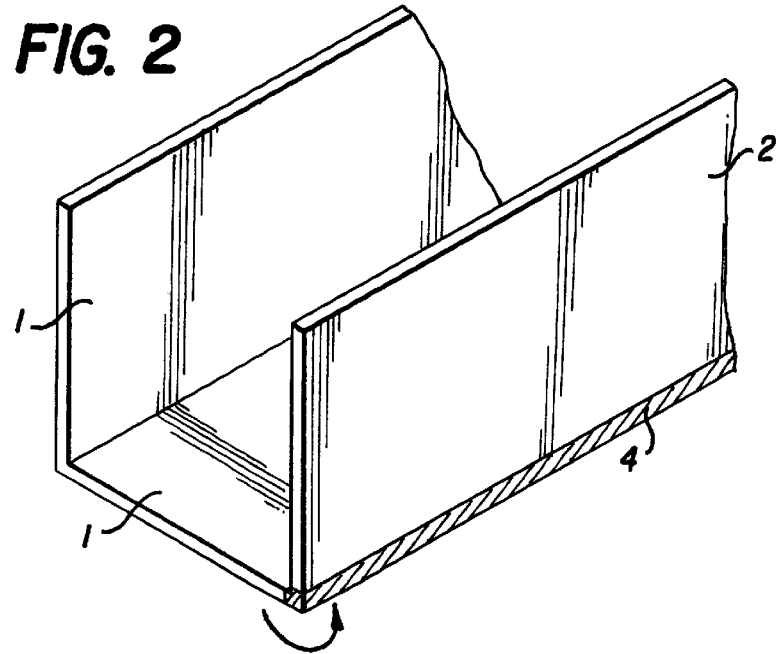
FIG. 2 shows an open cable duct section as a rigid, angular basic segment and another raised, elastically connected segment in a perspective view.

FIG. 2 shows an open cable duct section that is formed by raising and locking one of the elastically connected segments designated as 2. This open cable duct section can be closed with a separate top segment.

Figure 3A:
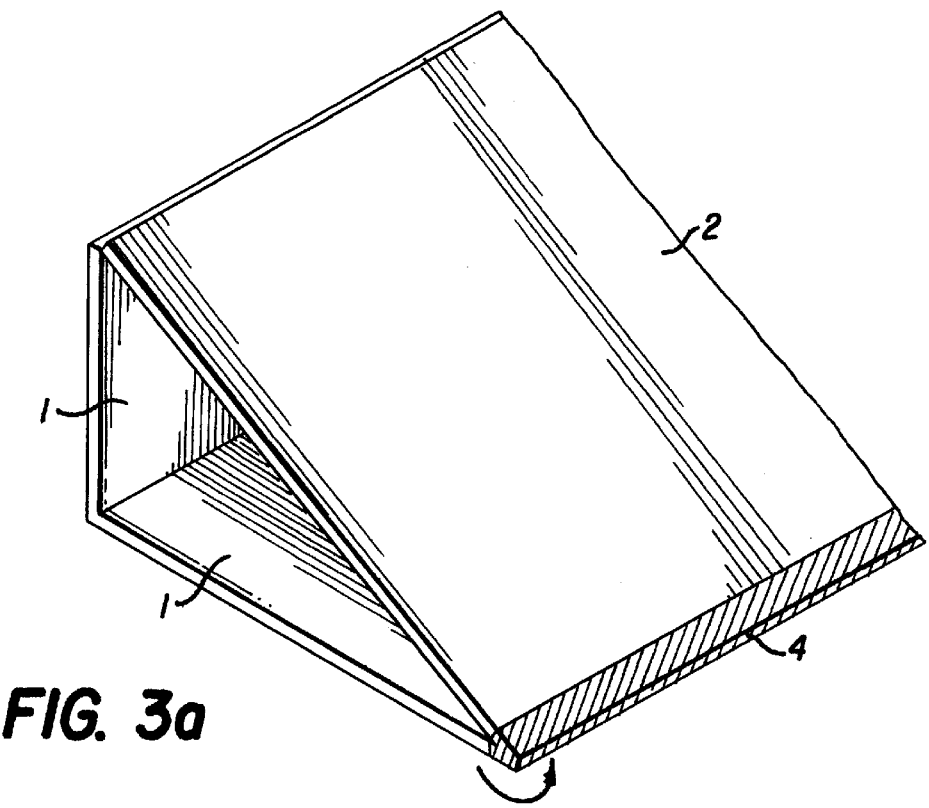
FIG. 3a shows a closed cable duct section as a rigid, angular basic segment and another elastically connected segment in a perspective view.

In FIG. 3a a closed cable duct section is shown. By raising and/or locking the elastically connected segment 2, a closed, triangular cable duct is formed. These cable duct variations are particularly well suited for installing in corners.

Figure 3B:
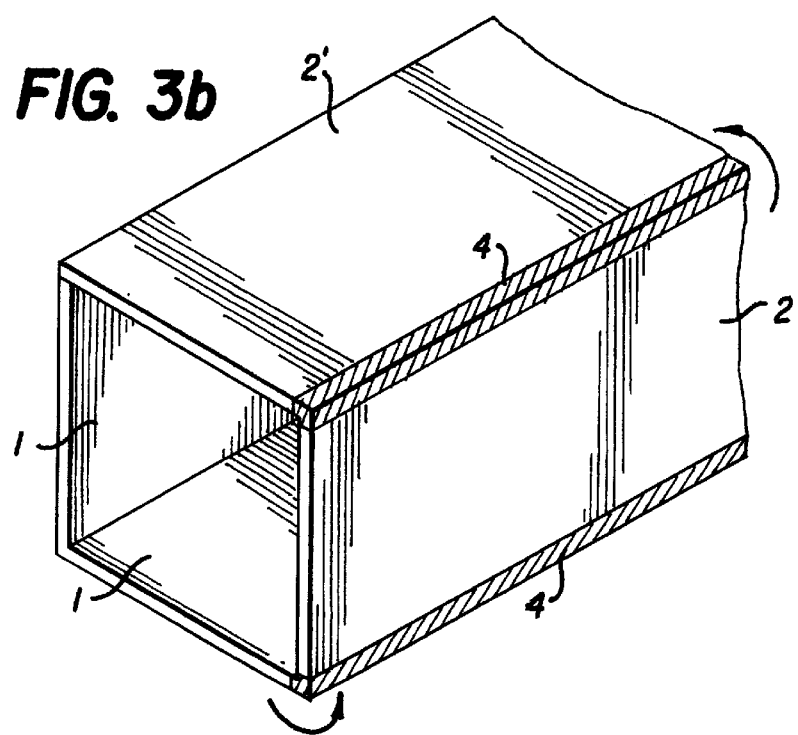
FIG. 3b shows a closed cable duct section according to FIG. 3a designed as a polygon in a perspective view.

In FIG. 3b a closed cable duct section that is analogous to FIG. 3a is shown. By raising and/or locking several elastically connected segments 2, 2', a closed polygon section is formed, which in this example is a closed, rectangular cable duct.

Figure 4:
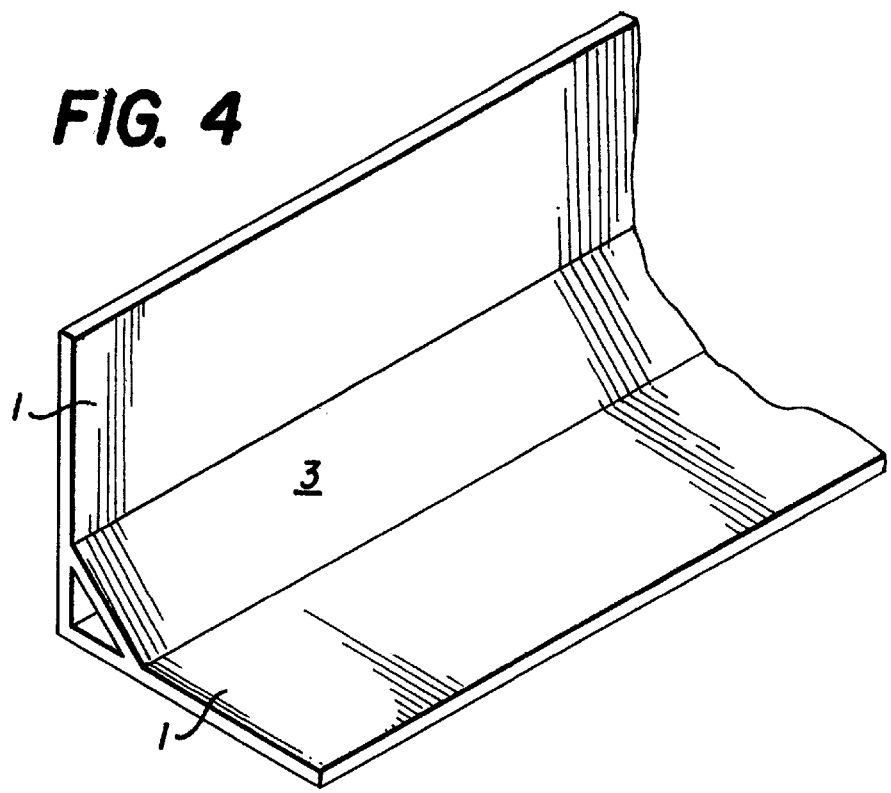
FIG. 4 shows a rigid, angular basic segment reinforced in the interior angle area in a perspective view.

In FIG. 4 an additional reinforcement that reinforces the rigid, angular basic segment 1 additionally in the interior angle area is designated as 3. This reinforcement 3 gives the basic segment 1 greater flexural strength.

Figure 5:
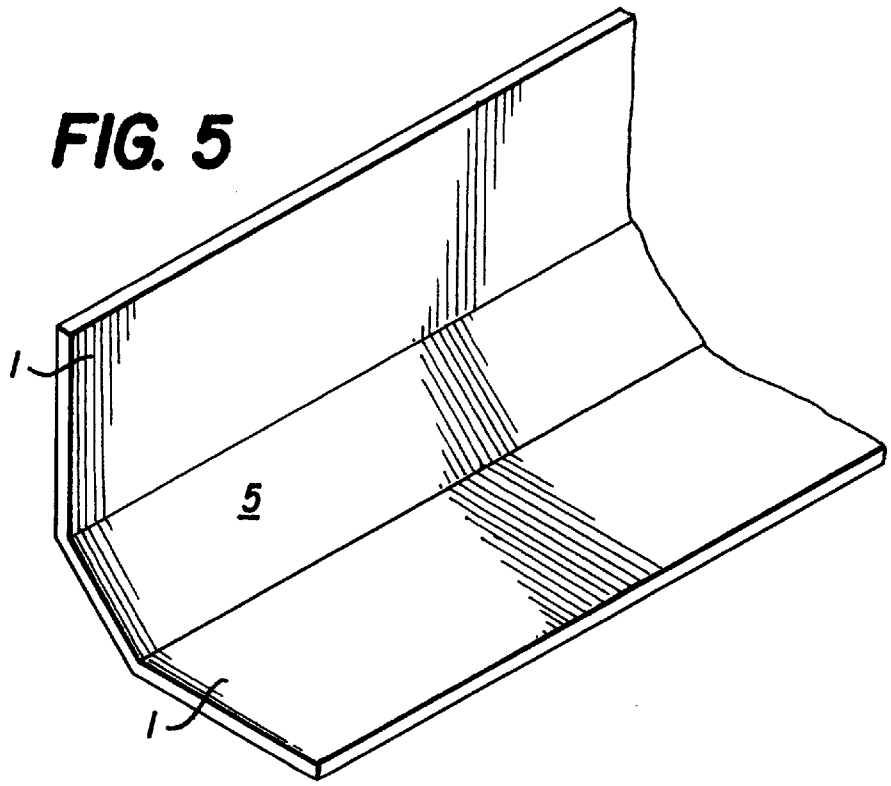
FIG. 5 shows a rigid, angular basic segment sloped in the outer angle area in a perspective view.

In FIG. 5 an incline is designated as 5. In this connection the rigid, angular basic segment 1 is sloped or rounded off in the outer angle area, as a result of which inaccurate masonry or angular deflections in corner installations are compensated for.

Figure 6:
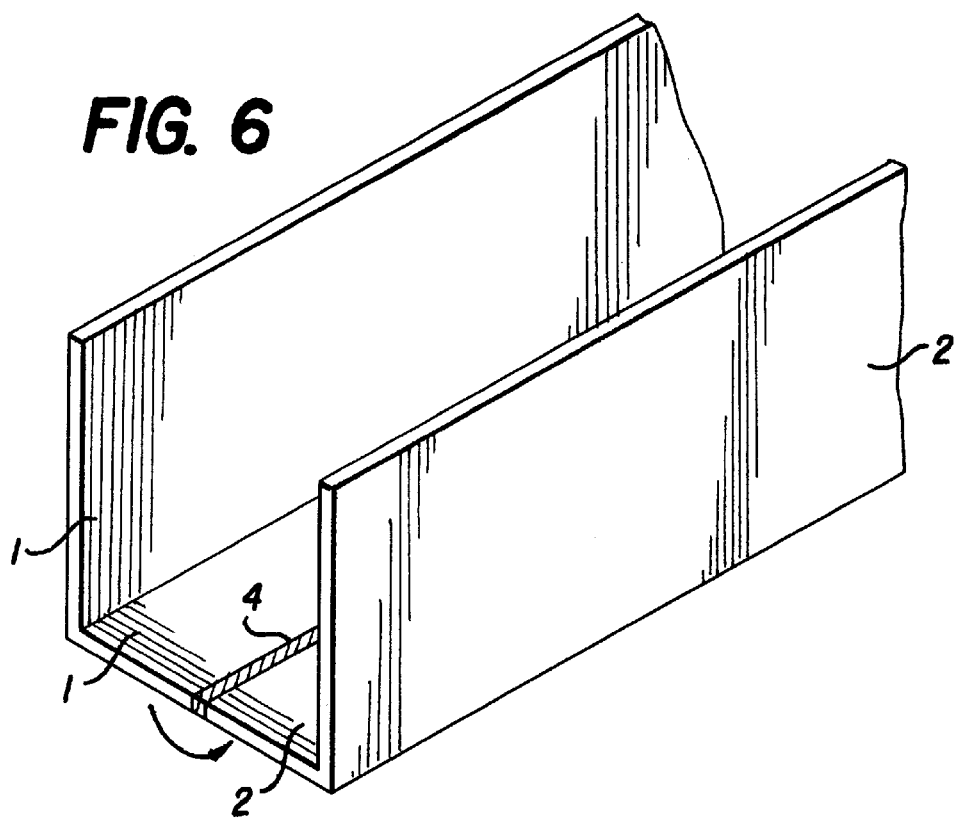
FIG. 6 shows a plastic section as a rigid, angular basic segment and another elastically connected, rigid, angular segment in a perspective view.

In FIG. 6 another rigid, angular segment 2 is connected to the rigid, angular basic element 1. In this way a closed cable duct-section can be formed with a single raising and locking action.

Figure 7:
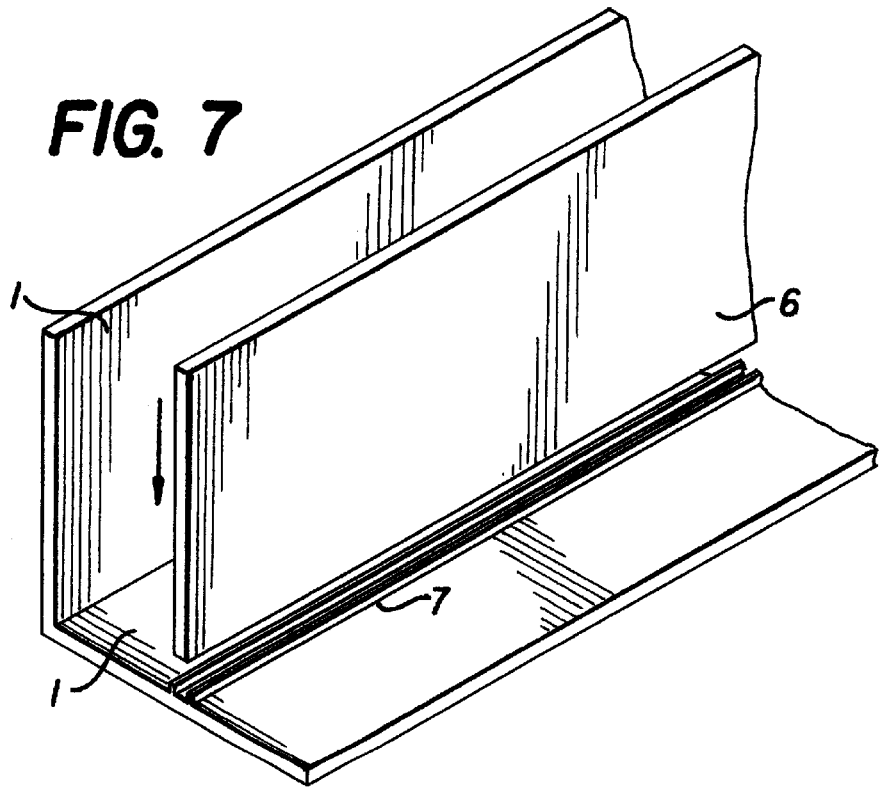
FIG. 7 shows a rigid, angular basic segment with a mounting piece and dividing wall in a perspective view.

In FIG. 7 a mounting piece, with the help of which a separate dividing wall 6 can be fastened in the basic segment 1, is designated as 7. This dividing wall makes the separation of high-tension and low-voltage currents possible, as well as the separation of electric liners and heating pipes.

Figure 8A:
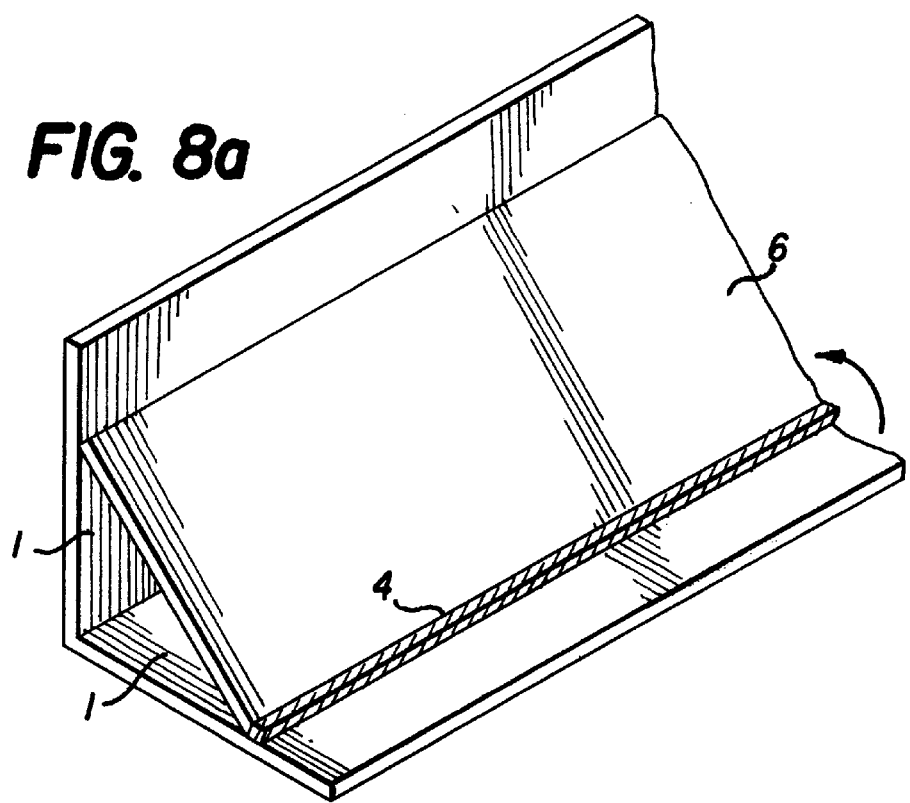
FIG. 8a shows a rigid, angular basic segment with an elastically connected dividing wall in a perspective view.

In FIG. 8a a dividing wall 6 is shown that is elastically connected to the basic segment. With suitable dimensioning, the dividing wall 6 can be joined to the basic segment so it is flat and thus does not impair the excellent stacking properties of the angle section.

Figure 8B:
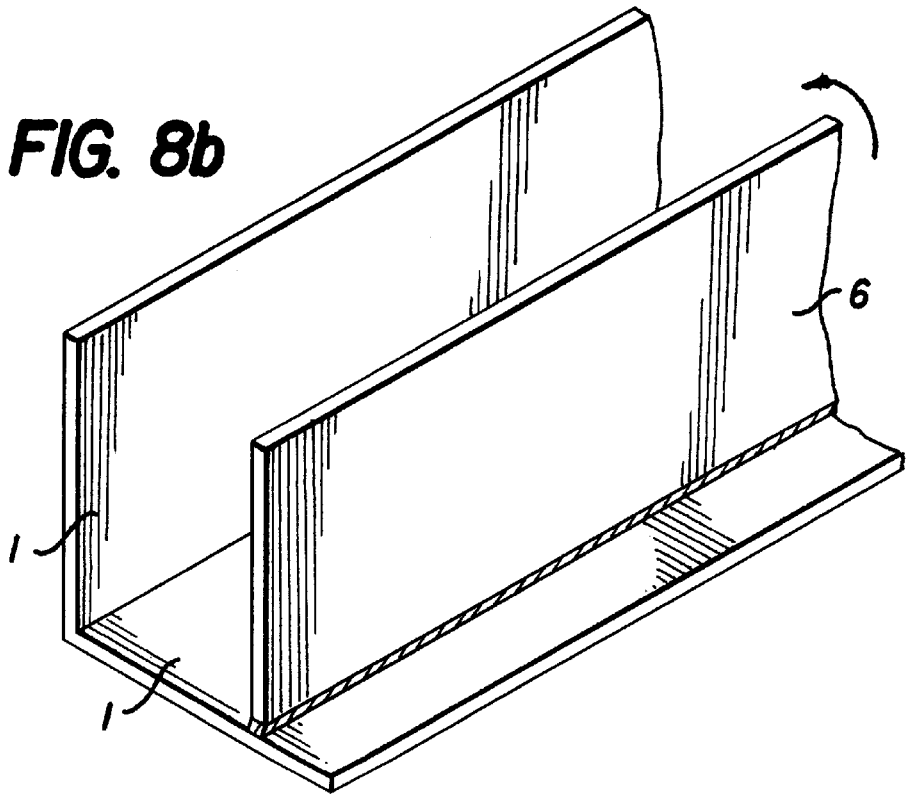
FIG. 8b shows a rigid, angular basic segment according to FIG. 8a with a rigidly connected dividing wall in a perspective view.

In FIG. 8b a dividing wall 6 is rigidly connected to the basic section.

Figure 9:
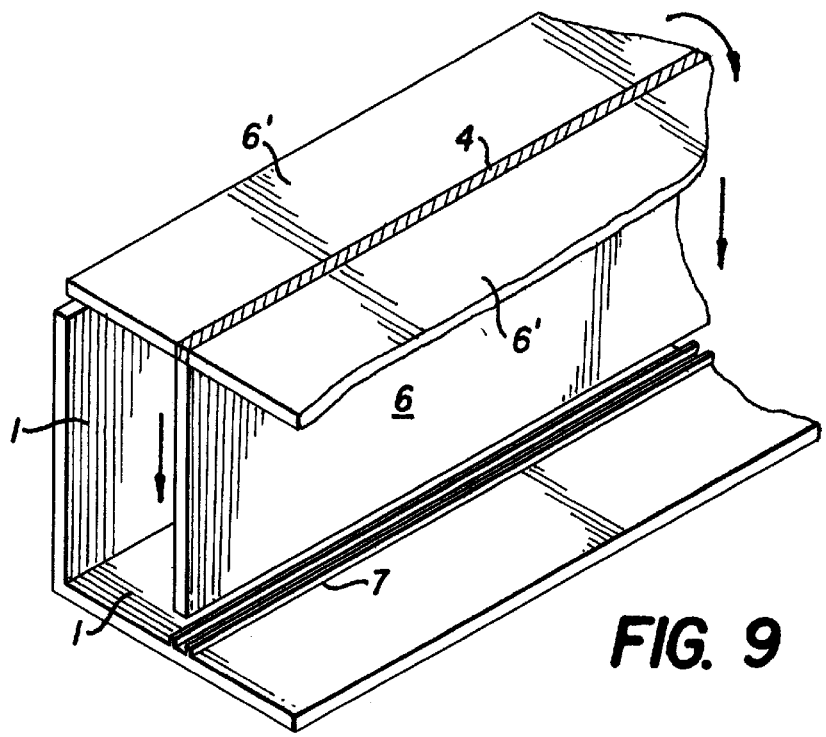
FIG. 9 shows a rigid, angular basic segment with a mounting piece and segments connected elastically to the dividing wall in a perspective view.

In FIG. 9 the reference number 6 designates a dividing wall to which the one or several other plastic segment(s) 6' is/are connected elastically. In this way the dividing wall 6 with the elastically connected plastic segments 6' takes on the function of a separate cover.

Figure 10:
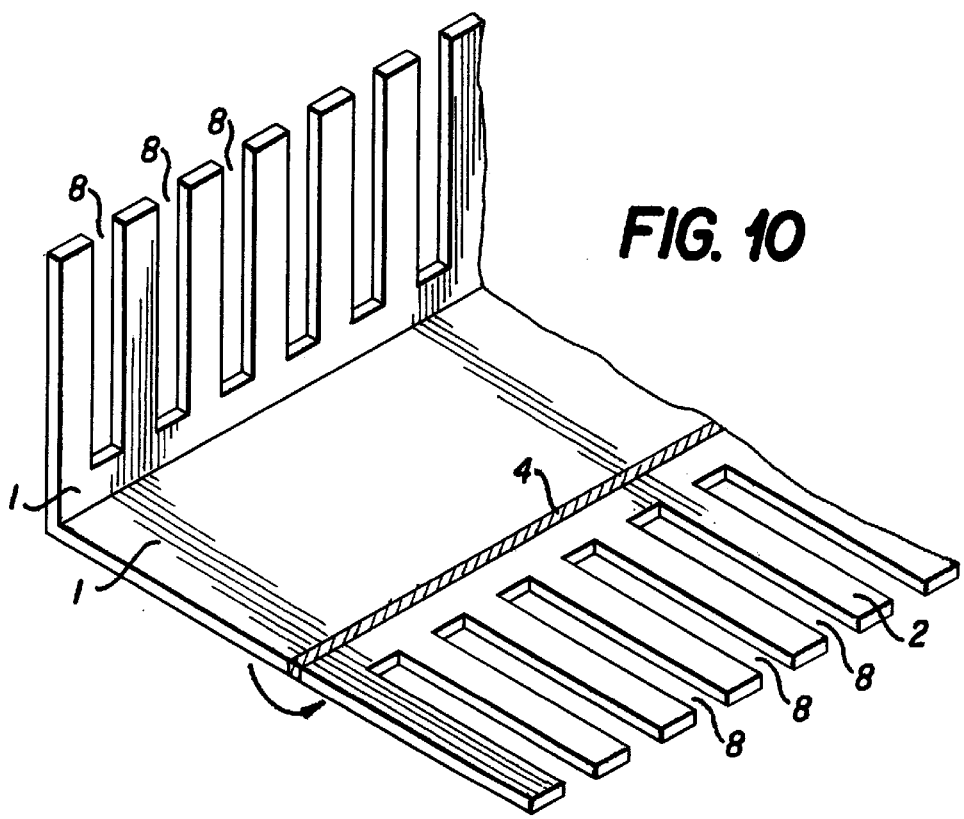
FIG. 10 shows a rigid, angular basic segment with slots in a perspective view.

In FIG. 10 the slots, designated as 8, are necessary for the lateral guiding of electric wire leads. These slots 8 can be attached either to the rigid, angular basic segment 1 or to one or several elastically connected segments 2, 2'.

Figure 11:
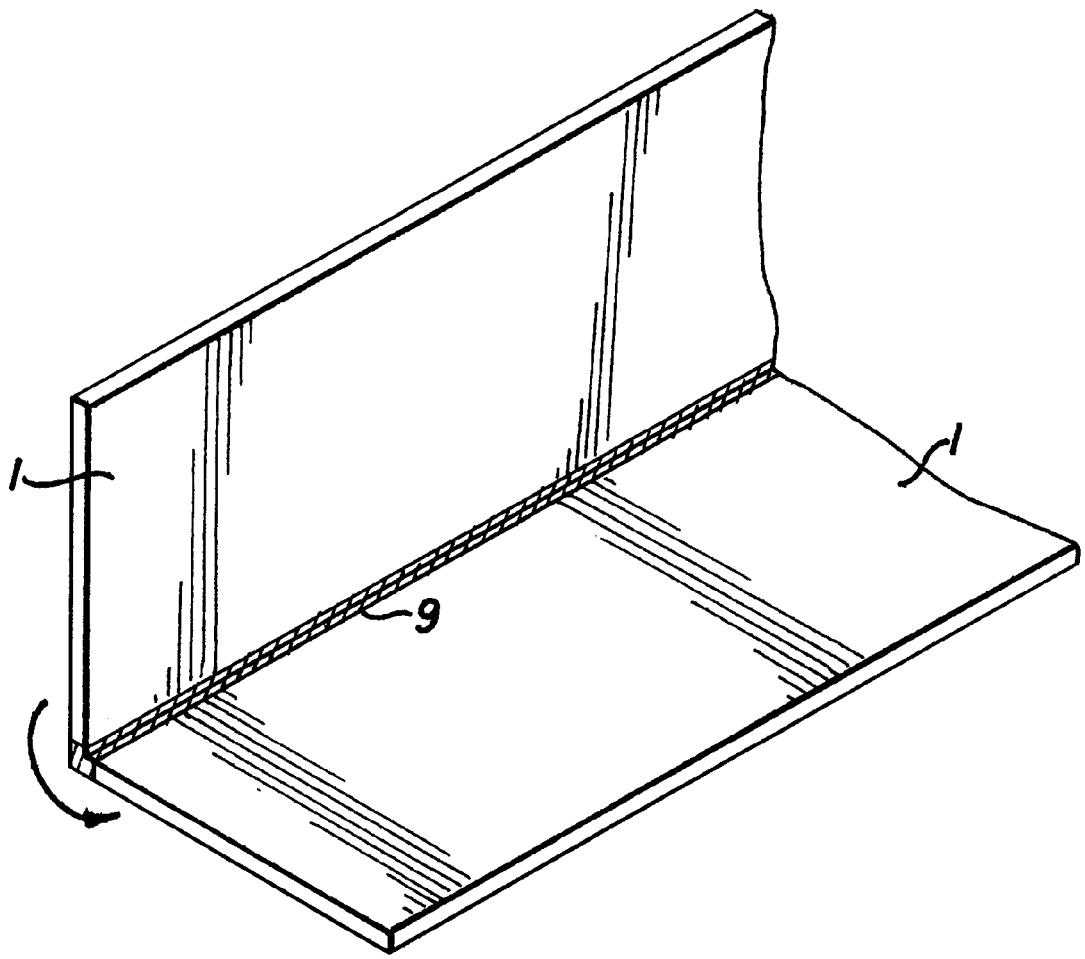
FIG. 11 shows a rigid, angular basic segment made of two component segments with an easily separable walkway connecting the two component segments in a perspective view.

In FIG. 11 the reference number 9 designates a walkway that connects the two component segments of the rigid, angular basic segments 1. This walkway 9 has the function that recesses can be built at a later time point even after installing the cable duct. In this connection the material for the walkway 9 is chosen so it can be cut easily without having a negative effect on the stability of the rigid, angular basic segment 1.

What is claimed is:

1. Mounting apparatus for installations of tubing, pipes, cables and other rigid or flexible elongate elements, comprising a first segment including a pair of longitudinally extending rectangular members which are rigidly fastened together along a longitudinal edge of each to maintain a predetermined angle between said members; and at least one additional segment in the form of a longitudinally extending member which is pivotally connected along one longitudinal edge thereof to a free longitudinal edge of one of said pair of members of said first segment, said pivotal connection being selected as one from among a group consisting of a hinge bar of soft plastic, a detachable hinged connection, and a reduced wall thickness between the pivotally connected members; whereby the member forming said at least one additional segment is pivotable to be positioned at a selected angle to said one member of the first segment to which it is connected to form an open or closed polygon to receive and retain said tubing, pipes, cables or other rigid or flexible elongate elements when said mounting apparatus is in use, or to enable stacking the pivotally connected members against each other when not in use.

2. The mounting apparatus of claim 1, wherein said pivotal connection is lockable so that the member forming said at least one additional segment and said one member of the first segment to which it is connected can be locked together at said selected angle.

3. The mounting apparatus of claim 1, including a plurality of additional segments each in the form of a longitudinally extending member which is pivotally connected along a free longitudinal edge thereof to a free longitudinal edge of an adjacent said member, one of which is said one of the pair of members of said first segment.

4. The mounting apparatus of claim 1, wherein each of said members is substantially flat so that the pivotally connected members are stackable to lie flat against each other.

5. The mounting apparatus of claim 1, wherein said predetermined angle between said pair of members of said first segment is approximately a right angle.

6. The mounting apparatus of claim 1, wherein all of said members are substantially coextensive longitudinally with one another.

7. Mounting apparatus for installations of tubing, pipes, cables and other rigid or flexible elongate elements, comprising a first segment including a pair of longitudinally extending rectangular members which are rigidly fastened together along a longitudinal edge of each to maintain a predetermined angle between said members; and a plurality of additional segments each in the form of a longitudinally extending member which is pivotally connected along a free longitudinal edge thereof to a free longitudinal edge of an adjacent said member, one of which is one of the pair of members of said first segment; the pivotal connection between said one member of the first segment and the adjacent member forming one of said additional segments being lockable at a selected angle therebetween to form an open or closed polygon to receive and retain said tubing, pipes, cables or other rigid or flexible elongate elements when said mounting apparatus is in use, or to enable stacking of the pivotally connected members against each other when not in use.

8. The mounting apparatus of claim 7, wherein each of said members is substantially flat so that the pivotally connected members are stackable to lie flat against each other.

9. The mounting apparatus of claim 7, wherein said predetermined angle between said pair of members of said first segment is approximately a right angle.

10. The mounting apparatus of claim 7, wherein all of said members are substantially coextensive longitudinally with one another.

11. The mounting apparatus of claim 7, wherein each of said pivotal connections is selected as one from among a group comprising a hinge bar of soft plastic, a detachable hinged connection, and a reduced wall thickness between the adjacent pivotally connected members.

12. Mounting apparatus for installations of tubing, pipes, cables and other rigid or flexible elongate elements, comprising a first segment including a pair of longitudinally extending rectangular members which are rigidly fastened together along a longitudinal edge of each to maintain a predetermined angle between said members; and a plurality of additional segments each in the form of a longitudinally extending member which is pivotally connected along a free longitudinal edge thereof to a free longitudinal edge of an adjacent said member, one of which is one of the pair of members of said first segment; whereby the member forming the additional segment adjacent and pivotally connected to said one member of the first segment can be positioned at a selected angle to said one member to form an open or closed polygon to receive and retain said tubing, pipes, cables or other rigid or flexible elongate elements when said mounting apparatus is in use, and wherein each of said members is substantially flat so that the pivotally connected members are stackable to lie flat against each other when said mounting apparatus is not in use.

13. The mounting apparatus of claim 12, wherein said predetermined angle between said pair of members of said first segment is approximately a right angle.

14. The mounting apparatus of claim 12, wherein all of said members are substantially coextensive longitudinally with one another.

15. The mounting apparatus of claim 12, wherein each of said pivotal connections is selected as one from among a group comprising a hinge bar of soft plastic, a detachable hinged connection, and a reduced wall thickness between the adjacent pivotally connected members.

16. Mounting apparatus for installations of tubing, pipes, cables and other rigid or flexible elongate elements, comprising a first segment including a pair of longitudinally extending rectangular members which are rigidly fastened together along a longitudinal edge of each to maintain approximately a right angle between said members; and at least one additional segment in the form of a longitudinally extending member which is pivotally connected along one longitudinal edge thereof to a free longitudinal edge of one of said pair of members of said first segment; whereby the member forming said at least one additional segment is pivotable to be positioned at a selected angle to said one member of the first segment to which it is connected to form an open or closed polygon to receive and retain said tubing, pipes, cables or other rigid or flexible elongate elements when said mounting apparatus is in use, and wherein each of said members is substantially flat so that the pivotally connected members are stackable to lie flat against each other when said mounting apparatus is not in use.

17. The mounting apparatus of claim 16, wherein all of said members are substantially coextensive longitudinally with one another.

18. The mounting apparatus of claim 16, wherein the pivotal connection between the member of said at least one additional segment and said one of the pair of members of said first segment is selected as one from among a group comprising a hinge bar of soft plastic, a detachable hinged connection, and a reduced wall thickness therebetween.

19. The mounting apparatus of claim 16, further including a reinforcing strut in the corner forming said predetermined angle between said pair of members of the first segment.

20. The mounting apparatus of claim 16, wherein said pair of members of the first segment are joined by a longitudinal inclined section substantially perpendicular to a plane bisecting said predetermined angle therebetween.

21. The mounting apparatus of claim 16, wherein a longitudinal channel along (i) one of said pair of members of the first segment or (ii) the longitudinally extending member of said at least one additional segment, is constructed and adapted to retain an upstanding dividing wall within said open or closed polygon.

22. The mounting apparatus of claim 16, further including a plurality of slots in the wall of (i) one of said pair of members of the first segment or (ii) the longitudinally extending member of said at least one additional segment.

23. The mounting apparatus of claim 16, wherein said pair of members of said first segment are connected by a composition of readily separable material.

* * * * *